US010546366B2

(12) United States Patent
Bhatt et al.

(10) Patent No.: US 10,546,366 B2
(45) Date of Patent: Jan. 28, 2020

(54) MULTIFUNCTIONAL ENVIRONMENT FOR IMAGE CROPPING

(71) Applicant: Apple Inc., Cupertino, CA (US)

(72) Inventors: Nikhil Bhatt, San Francisco, CA (US); Timothy David Cherna, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/708,041

(22) Filed: Sep. 18, 2017

(65) Prior Publication Data

US 2018/0130182 A1     May 10, 2018

Related U.S. Application Data

(63) Continuation of application No. 14/880,940, filed on Oct. 12, 2015, now Pat. No. 9,767,535, which is a
(Continued)

(51) Int. Cl.
*G06T 11/00* (2006.01)
*G06T 3/60* (2006.01)
(Continued)

(52) U.S. Cl.
CPC .............. *G06T 3/60* (2013.01); *G06F 3/017* (2013.01); *G06F 3/0346* (2013.01);
(Continued)

(58) Field of Classification Search
None
See application file for complete search history.

(56) References Cited

U.S. PATENT DOCUMENTS 5,237,657 A     8/1993   Pearman et al.
5,473,740 A *  12/1995   Kasson ............... G06F 3/04845
                                                   345/628
(Continued)

FOREIGN PATENT DOCUMENTS

JP     2000-163031 A    6/2000
JP     2002-342033 A   11/2002
WO    WO-2013/009828 A1  1/2013

OTHER PUBLICATIONS

Dutch Search Report completed Oct. 26, 2012, for Dutch Application No. P6042333NL, one page.
(Continued)

*Primary Examiner* — Robert J Craddock
(74) *Attorney, Agent, or Firm* — Kubota & Basol LLP

(57) ABSTRACT

Methods, systems, and apparatus, including computer programs encoded on computer storage media, are described for combining the crop function with zoom, pan and straighten functions as part of a single cropping environment, such that a user can select a portion of an image for cropping, apply zoom, pan and straighten transformations to the selected image portion and then crop the transformed image portion in a single utility. In one aspect, the methods include the actions of receiving user input defining a crop region within a displayed image. The methods also include the actions of displaying a user interface including a cropping panel that is configured to display a subset of the image corresponding to the defined crop region. Further, the methods include the actions of receiving user input requesting to perform at least one of a zoom, rotate or translate operation on the crop region displayed in the cropping panel.

27 Claims, 11 Drawing Sheets

Related U.S. Application Data continuation of application No. 13/181,458, filed on Jul. 12, 2011, now Pat. No. 9,158,455.

(51) Int. Cl.

| | | |
|---|---|---|
| *G06F 3/0484* | (2013.01) | |
| *G06F 3/01* | (2006.01) | |
| *G06F 3/0488* | (2013.01) | |
| *G06F 3/0346* | (2013.01) | |
| *G06T 3/40* | (2006.01) | |

(52) U.S. Cl.
CPC ...... *G06F 3/04845* (2013.01); *G06F 3/04883* (2013.01); *G06F 3/04886* (2013.01); *G06T 3/40* (2013.01); *G06T 11/00* (2013.01); *G06F 2200/1637* (2013.01); *G06F 2203/04808* (2013.01); *G06T 2210/22* (2013.01)

(56) References Cited

U.S. PATENT DOCUMENTS

| | | | |
|---|---|---|---|
| 5,483,261 A | | 1/1996 | Yasutake |
| 5,488,204 A | | 1/1996 | Mead et al. |
| 5,825,352 A | | 10/1998 | Bisset et al. |
| 5,835,079 A | | 11/1998 | Shieh |
| 5,880,411 A | | 3/1999 | Gillespie et al. |
| 6,188,391 B1 | | 2/2001 | Seely et al. |
| 6,281,872 B1 | | 8/2001 | Cariffe |
| 6,298,157 B1 | | 10/2001 | Wilensky |
| 6,310,610 B1 | | 10/2001 | Beaton et al. |
| 6,323,846 B1 | | 11/2001 | Westerman et al. |
| 6,560,376 B2 | | 5/2003 | Kimbell et al. |
| 6,590,590 B1 | | 7/2003 | Wen et al. |
| 6,654,506 B1 | | 11/2003 | Luo et al. |
| 6,690,387 B2 | | 2/2004 | Zimmerman et al. |
| 6,714,317 B2 | | 3/2004 | Lu |
| 6,883,140 B1 | | 4/2005 | Acker et al. |
| 6,970,607 B2 | | 11/2005 | Jia et al. |
| 7,015,894 B2 | | 3/2006 | Morohoshi |
| 7,184,064 B2 | | 2/2007 | Zimmerman et al. |
| 7,456,849 B2 | | 11/2008 | Brooke |
| 7,663,607 B2 | | 2/2010 | Hotelling et al. |
| 7,679,625 B1 * | | 3/2010 | Fagans .................... G06T 3/608 |
| | | | 345/620 |
| 7,719,523 B2 | | 5/2010 | Hillis |
| 8,139,043 B2 | | 3/2012 | Hillis |
| 8,164,577 B2 | | 4/2012 | Tsuzaki et al. |
| 8,479,122 B2 | | 7/2013 | Hotelling et al. |
| 8,490,013 B2 | | 7/2013 | Um |
| 9,158,455 B2 | | 10/2015 | Bhatt et al. |
| 2004/0240737 A1 | | 12/2004 | Lim et al. |
| 2005/0104897 A1 * | | 5/2005 | Walker, Jr. .......... G06F 3/04845 |
| | | | 345/620 |
| 2006/0197753 A1 | | 9/2006 | Hotelling |
| 2009/0322700 A1 | | 12/2009 | D'Souza et al. |
| 2010/0073402 A1 | | 3/2010 | Delia et al. |
| 2010/0188328 A1 | | 7/2010 | Dodge et al. |
| 2010/0289754 A1 | | 11/2010 | Sleeman et al. |
| 2013/0016122 A1 | | 1/2013 | Bhatt et al. |

OTHER PUBLICATIONS

Final Office Action dated Aug. 27, 2014, for U.S. Appl. No. 13/181,458, filed Jul. 12, 2011, 43 pages.

Final Office Action dated Jun. 2, 2016, for U.S. Appl. No. 14/880,940, filed Oct. 12, 2015, 13 pages.

International Search Report dated Oct. 24, 2012, for PCT Application No. PCT/US2012/046199, filed Jul. 11, 2012, four pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Dec. 30, 2013, for U.S. Appl. No. 13/181,458, filed Jul. 12, 2011, 42 pages.

Non-Final Office Action dated Dec. 18, 2015, for U.S. Appl. No. 14/880,940, filed Oct. 12, 2015, 11 pages.

Non-Final Office Action dated Dec. 12, 2016, for U.S. Appl. No. 14/880,940, filed Oct. 12, 2015, 12 pages.

Notice of Allowance dated Jun. 2, 2015, for U.S. Appl. No. 13/181,458, filed Jul. 12, 2011, five pages.

Notice of Allowance dated May 24, 2017, for U.S. Appl. No. 14/880,940, filed Oct. 12, 2015, 10 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Steve Patterson, "Straighten and Crop Images in Photoshop CS5/ Learn Photoshop with Photo Editing Tutorials at Photoshop Essentials. com!", http://www.photoshopessentials.com/photo-editing/cs5/straighten-images/, down loaded Jul. 12, 2011, 3 pages.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

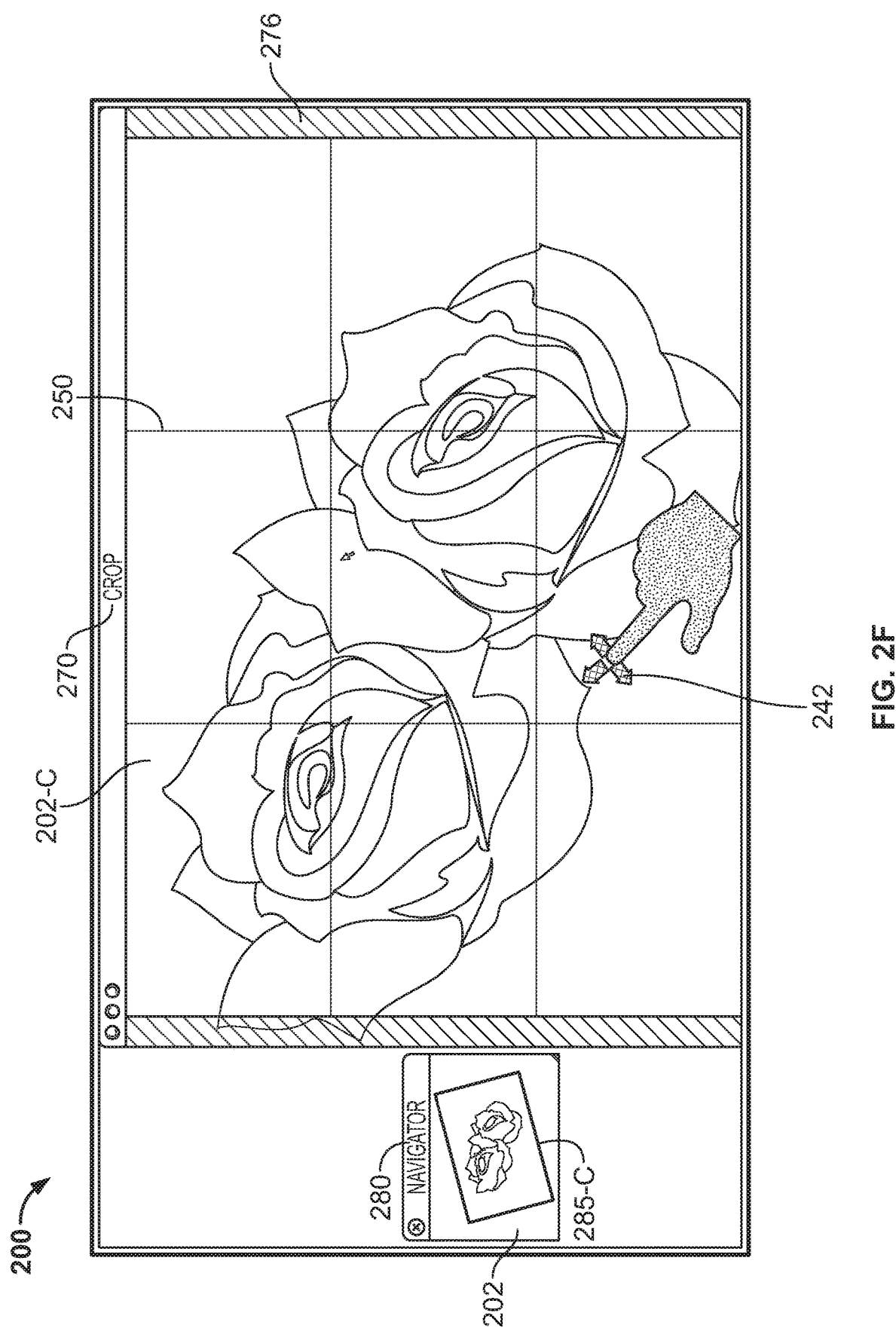

MULTIFUNCTIONAL ENVIRONMENT FOR IMAGE CROPPING

CROSS-REFERENCES TO RELATED APPLICATIONS

This application is a continuation of U.S. application Ser. No. 14/880,940, filed Oct. 12, 2015 (now U.S. Publication No. US-2016-0035065-A1 published on Feb. 4, 2016), which is a continuation of U.S. patent application Ser. No. 13/181,458, filed Jul. 12, 2011 (now U.S. Pat. No. 9,158,455 granted on Oct. 13, 2015), the contents of which are incorporated by reference herein in its entirety for all purposes.

BACKGROUND

This specification relates to performing image transformations within a cropping environment. An image processing application can receive a request from a user associated with the application to crop a portion of a digital image. The cropped portion can have a predefined aspect ratio, e.g., 5×7, or a custom aspect ratio. Usually, a user applies zoom, pan and straighten transformations prior to and independently of cropping the image. In that fashion, the user iteratively applies the rotation (or zoom or pan) and crop functions repeatedly, as part of a trial-and-error process. For example, a user of a current cropping system applies a crop-box to a digital image and the current system automatically zooms into the image content included in the crop-box. However, if the user is not satisfied with some aspect of the zoomed view associated with the image content inside the applied crop-box, then the user must zoom out to the previous view of the image in order to apply another crop-box. Once the new crop-box is set by the user, the current system automatically zooms into image content included in the newly applied crop-box. This cycle is repeated until the desired result is achieved.

SUMMARY

Technologies described in this specification can be used to combine the crop function with zoom, pan and straighten functions as part of a single cropping environment, such that a user can select a portion of an image for cropping, apply zoom, pan and straighten transformations to the selected image portion and then crop the transformed image portion in a single utility. The user can enter the zoom, pan and rotate instructions by using multi-touch gestures, gyroscope/accelerometer sensitive gestures or mouse/keyboard actions with respect to the selected image content within the cropping environment. By using the disclosed technologies, the user can see what an output cropped image would look like once straighten, zoom or pan functions followed by the crop function are applied to an image, and can refine the end-result in one cropping step. Moreover, the technologies described in this specification can be used to attempt and evaluate multiple compositions (e.g., different orientations, magnifications, portions of image content) prior to committing the applied transformations to the final, cropped composition.

In general, one aspect of the subject matter described in this specification can be implemented in methods that include the actions of receiving user input defining a crop region within a displayed image. The methods also include the actions of displaying a user interface including a cropping panel that is configured to display a subset of the image corresponding to the defined crop region. Further, the methods include the actions of receiving user input requesting to perform at least one of a zoom, rotate or translate operation on the crop region displayed in the cropping panel.

Other implementations of this aspect include corresponding computer systems, apparatus, and computer programs recorded on one or more computer storage devices, each configured to perform the actions of the methods. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other implementations can each optionally include one or more of the following features, alone or in combination. In some implementations, the methods can include the actions of updating the cropping panel display in real time to show a result of the user requested operation. In addition, any of zoom, rotate or translate operations can be performed within the cropping panel without leaving the cropping panel view. In some implementations, receiving the user input requesting to perform at least one of a zoom, rotate or translate operation on the crop region displayed in the cropping panel can include detecting a multi-touch gesture relating to the corresponding operation. In some implementations, receiving the user input requesting to perform at least one of a zoom, rotate or translate operation on the crop region displayed in the cropping panel includes detecting a gyroscope or accelerometer sensitive gesture relating to the corresponding operation.

In some implementations, the methods can further include the actions of determining that a request to rotate the subset of the image corresponding to the defined crop region would result in showing at least one edge of the image within the cropping panel. As such, the methods can include the actions of performing, in response to the foregoing determination, the requested rotation of the subset of the image corresponding to the defined crop region concurrently with zooming there into, such that the rotated and zoomed subset of the image corresponding to the defined crop region can be displayed in the cropping panel without having to show any of the image edges.

In some implementations, receiving the user input requesting to perform at least one of a zoom, rotate or translate operation on the crop region displayed in the cropping panel includes detecting respective gestures corresponding to two or more of the zoom, rotate or translate operations. In these implementations, the methods can also include the actions of transforming the crop region displayed in the cropping panel by using an operation corresponding to one of the detected gestures that was detected first, and excluding other operations corresponding to other of the detected gestures that were detected subsequent to the first one.

Receiving the user input requesting to perform at least one of a zoom, rotate or translate operation on the crop region displayed in the cropping panel can include detecting a scaling gesture corresponding to a zoom operation and a rotation gesture corresponding to a straighten operation. In some implementations, the methods can further include the actions of transforming the crop region displayed in the cropping panel by using both the zoom operation corresponding to the detected scaling gesture and the straighten operation corresponding to the detected scaling gesture. In other implementations, the methods can include the actions of transforming the crop region displayed in the cropping panel by using the zoom operation corresponding to the detected scaling gesture, and further transforming the crop region displayed in the cropping panel by using the straighten operation corresponding to the detected rotation gesture only in response to determining that a rotation angle associated with the detected rotation gesture exceeds a predetermined angle. In the latter implementations, in response to determining that the rotation angle associated with the detected rotation gesture exceeds the predetermined angle, the user can be notified that the straighten operation can be performed at least in part by concurrently displaying a grid within the defined crop region and aligned with the cropping panel. In some other implementations, the methods can further include the actions of transforming the crop region displayed in the cropping panel by using the straighten operation corresponding to the detected rotation gesture, and transforming the crop region displayed in the cropping panel by using the zoom operation corresponding to the detected scaling gesture only in response to determining that a scaling factor associated with the detected scaling gesture exceeds a predetermined scaling factor.

In some implementations, the crop region can have a pre-defined aspect ratio. In addition, the crop region can have an arbitrary aspect ratio. In some implementations, the displayed user interface further includes a whole view panel. As such, the methods can include the actions of displaying the entire image in the whole view panel concurrently with displaying the image subset corresponding to the defined crop region in the cropping panel. Additionally, the methods can include the actions of displaying in the whole view panel an indicator of the cropped image contour.

Another aspect of the subject matter described in this specification can be implemented in systems including at least one display device, at least one processor and storage configured to store instructions that are operable, when executed by the processor, to cause the system to perform operations including displaying, in a first panel on the display device, a subset of an image in a window representing a portion to be cropped within the image. The operations further include receiving a user request to apply at least one other image transformation to the image subset displayed in the window, transforming the image subset displayed in the window based on the received request, and cropping the transformed image subset displayed in the window to obtain the cropped image portion. The other transformation of the image subset includes a rotation, a zoom and a pan.

The foregoing and other implementations can each optionally include one or more of the following features, alone or in combination. In some implementations, the operations can include concurrently displaying, in a second panel on the display device, a contour of the image portion to be cropped within the image overlaid on the image, and linking relative position, orientation and size of the contour with respect to the image displayed in the second panel to mimic the transformations applied to the image subset in the window displayed in the first panel. Further, the image outside of the window can be covered by an opaque layer. Furthermore, the image outside of the window can be covered by a translucent layer. Additionally, the operations can also include concurrently displaying in the first panel a grid within and aligned to the window to assist the user in providing rotation requests. For example, the grid can correspond to a rule of thirds with respect to the window.

In some implementations, the operations can further include determining that a request to rotate the subset of the image displayed in the window would result in showing at least one edge of the image in the window, and in response to this determination, performing the requested rotation of the image subset in the window concurrently with zooming into the image subset in the window, such that the rotated and zoomed image subset can be displayed in the window without having to show any of the image edges. In some implementations, the operations can also include detecting respective gestures corresponding to two or more of the zoom, rotate or translate transformations, then transforming the image subset displayed in the window by using a transformation corresponding to one of the detected gestures that was detected first, and excluding other transformations corresponding to other of the detected gestures that were detected subsequent to the first one. In some implementations, the operations can include detecting a scaling gesture corresponding to a zoom operation and a rotation gesture corresponding to a straighten operation, then transforming the image subset displayed in the window by using the zoom operation corresponding to the detected scaling gesture, and further transforming the image subset displayed in the window by using the straighten operation corresponding to the detected rotation gesture only in response to determining that a rotation angle associated with the detected rotation gesture exceeds a predetermined angle.

Particular implementations of the subject matter described in this specification can be configured so as to realize one or more of the following potential advantages. Within the disclosed cropping environment, the user can crop in one single cropping step a selected image portion that contains rotation, zoom and pan transformations. In addition, the systems and techniques described in this specification can be integrated into other crop systems (where the user selects from preset crop-box aspect ratios or drags out a rectangle to define a crop-box.) Moreover, the disclosed technology supports both unconstrained (free form) cropping as well as constrained cropping to an aspect ratio.

The described techniques enable a user to control, with multi-touch gestures, or with gestures detectable by a gyroscope and/or two or more accelerometers, or with mouse/keyboard instructions, a multifunctional cropping utility that combines the crop function with pan, rotate and zoom functions. For instance, the disclosed multifunctional cropping utility can be configured to interpret zoom and straighten multi-touch gestures that are entered concurrently by a user as a compound request and, thus, can simultaneously apply the corresponding scaling and rotation transformations to a portion of an image selected for cropping. Moreover, the multifunctional cropping utility described in this specification can be configured to perform individual transformations to the image content selected for cropping in situations when the user enters a multi-touch gesture that inadvertently combines zoom and straighten gestures. For example, the multifunctional cropping utility can only perform the transformation corresponding to the first detected gesture on the image content selected for cropping, and can exclude the transformation(s) corresponding to gestures detected after the first detected gesture. As another example, the multifunctional cropping utility can first perform the scaling transformation corresponding to the detected zoom gesture on the image content selected for cropping, and may perform the rotation transformation on the same only once the multifunctional cropping utility determines that a rotation angle associated with the straighten gesture exceeds a predetermined angle. In this manner, the multifunctional cropping utility can zoom the image content selected for cropping without inadvertently rotating it.

Two linked views of the disclosed multifunctional cropping utility can concurrently display the crop outline on the original image and the resulting cropped image in real time, respectively. This optional dual-view feature of the multifunctional cropping utility enables the user to see what the output would be once crop and straighten (and/or zoom and pan) functions are applied to the image, and to refine the end-result without having to go in-and-out of the cropping utility through a repeated trial-and-error process.

Accordingly, the systems and techniques described in this specification allow a user who attempts to make a tight crop, e.g. by applying a crop-box that is relatively small in comparison to a large image, to avoid having to perform a potentially frustrating trial-and-error sequence of image transformations that are performed independently from the crop function; and instead, the disclosed technologies allow the user to perform as many image transformations as necessary without having to leave the crop-box associated with the tight crop.

Details of one or more implementations of the described subject matter are set forth in the accompanying drawings and the description below. Other features, aspects, and potential advantages will become apparent from the description, the drawings, and the claims.

BRIEF DESCRIPTION OF THE DRAWINGS

FIGS. 2A-2G show aspects of a multifunctional image cropping environment.

Like reference numbers and designations in the various drawings indicate like elements.

DETAILED DESCRIPTION

Figure 1:
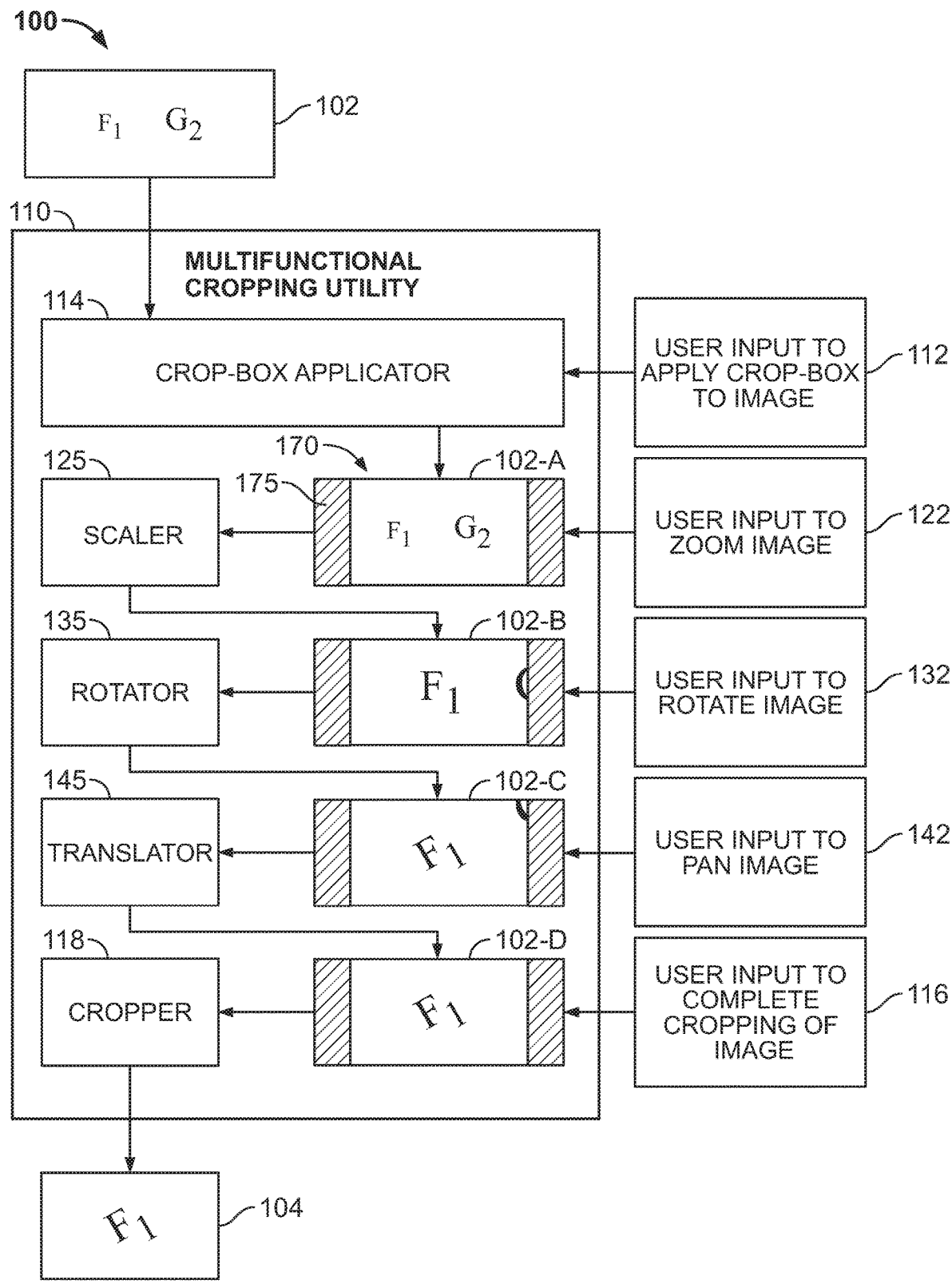
FIG. 1 illustrates an example of a system that includes a multifunctional cropping environment.

FIG. 1 illustrates an example of a system that includes a multifunctional cropping environment. The system 100 can be implemented as part of an image processing application executed by a computer system. The system 100 can include a user interface that provides controls and indicators that can be used by a user associated with the image processing application to select one or more images for processing and to specify how to process the selected image(s). The system 100 can also include a plurality of utilities that carry out under-the-hood processing of the selected image(s).

The plurality of utilities of the system 100 can include a multifunctional cropping utility 110. The multifunctional cropping utility 110 can receive a digital image 102 and a sequence of instructions for processing the received image 102. The sequence of instructions can begin with a request to initiate 112 cropping of an image, can include instructions to zoom 122, rotate 132 and pan 142 the image to be cropped and can end with a request to complete 116 cropping of the image portion 104. In general, the instructions received by the multifunctional cropping utility 110 are processed by various modules therein to allow a user associated with the system 100 to evaluate multiple compositions (e.g., different orientations, magnifications, portions of content) from the image 102 prior to committing the applied transformations to the final, cropped composition 104. In FIG. 1, these various modules include modules relating to image cropping, e.g., a crop-box applicator 114 and a cropper 118, and modules relating to image transformations, e.g., a scaler 125 (e.g., for zooming in/out of the image 102), a rotator 135 (e.g., for straightening the image 102) and a translator 145 (e.g., for panning the image 102.) Aspects of the functionality for some of the modules of the multifunctional cropping utility 110 are illustrated in FIGS. 2A-2G. A system 200 described below in connection with FIGS. 2A-2G can correspond to the system 100.

In FIG. 1, the digital image 102 depicts image content F in a first image portion (denoted F1) and image content G in a second image portions (denoted G2). The image portion G2 can be larger than the image portion F1, for instance. For example, the image portion F1 can correspond to a first person's face and the image portion G2 can correspond to a second person's face. As another example illustrated in FIGS. 2A-2G, the image portion F1 can correspond to a floral arrangement (in the foreground of an image 202) and the image portion G2 can correspond to the image 202's content around the floral arrangement (in the background.) In general, the image portion F1 can correspond to content of the image 102 that a user of the image processing application would desire to retain and improve/enhance, while the image portion G2 can correspond to content of the image 102 that the user would like to discard. Accordingly, the user can use the multifunctional cropping utility 110 to retain only the desired image portion F1 of the image 102, and while doing so, to further transform the retained image portion F1, by zooming, straightening and panning this image portion F1 to create a visually pleasing cropped output 104.

Figure 2A:
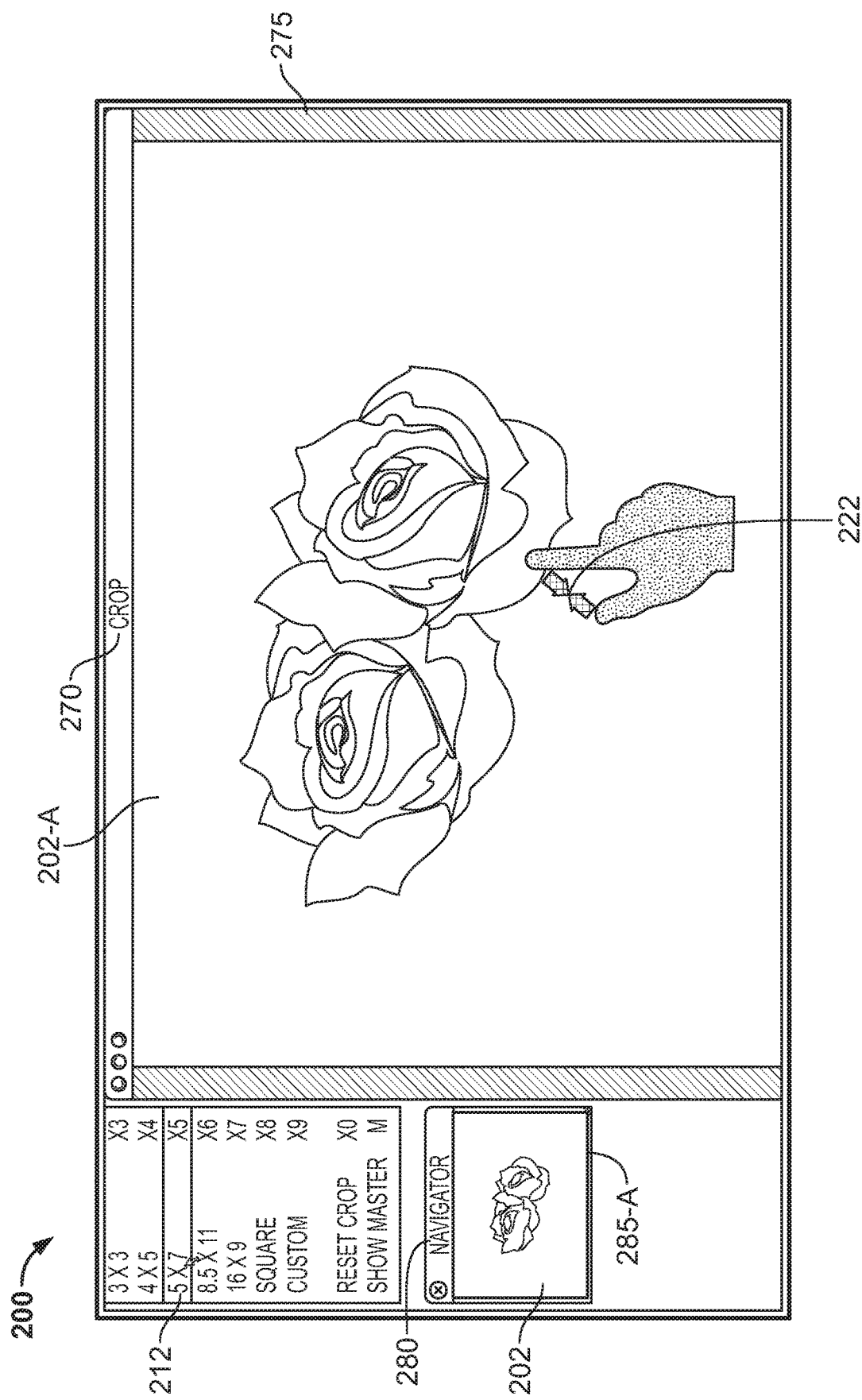

The multifunctional cropping utility can access the image 102 and can receive a user request 112 to apply a crop-box to the image 102. In FIG. 2A, the user can select to apply a crop-box via a menu 212 of the system 200. The crop-box can have a predetermined aspect ratio, e.g. 5×7, and can be selected from among other predetermined aspect ratios, e.g. 3×4, 4×5, 8.5×11, 16×9, etc. The crop-box applicator 114 overlays the selected crop-box on the image 102, and can mask the content of the image outside of the crop-box with an opaque layer. For instance, the multifunctional cropping utility 110 can present the user content of the image 102-A within the applied crop-box and the opaque layer 175 that covers the image content outside of the applied crop-box. In FIG. 2A, content of the image 202-A within the applied 5×7 crop-box and the opaque layer 275 that covers the image content outside of the applied 5×7 crop-box is presented in a panel 270 of the graphical user interface associated with the system 200.

The opening of the opaque layer 175 corresponding to the crop-box shows the image cropped as little as possible while maintaining the selected aspect ratio. The image content 102-A shown within the overlaid crop-box can be panned 145, zoomed 125, rotated 135 by the multifunctional cropping utility 110 as requested by the user via respective instructions 142, 122, 132 entered using multi-touch gestures (or gyroscope/accelerometer sensitive gestures or keyboard/mouse instructions) while the multifunctional cropping utility 110 maintains the size and orientation of the crop-box with respect to the viewer 170. Instead of selecting from among crop-boxes having predetermined aspect ratios, e.g., using the menu 212 depicted in FIG. 2A, the user can also draw a crop-box on the image 202 that has a predetermined aspect ratio or an arbitrary aspect ratio. Alternatively, the user can drag the crop-box's edges and/or corners to reshape a predetermined or arbitrary aspect ratio of the crop-box to another predetermined or arbitrary aspect ratio of the crop-box. In some implementations, hints or snapping behavior can be presented by the system 200 as the user resizes a cropbox having an arbitrary aspect ratio through known aspect ratios. In addition, the user can also move the position of a crop-box relative to the image 202.

Once the crop-box has been resized and/or moved by the user relative to the image 202, the system 200 can resize the crop-box and the portion of the image within the resized crop-box to the maximal display within the panel 270 of the user interface. At this point, the user can press a user interface control (e.g., the Return key) and then the multifunctional cropping utility 110 allows the user to use, for example, instructions 142, 122 and 132 to respectively pan 145, zoom 125 and rotate 135 the content of the image 102-A showing through the drawn crop-box. In this manner, the user can establish a starting point tighter than the default minimally cropped image. The user can enter the instructions 142, 122 and 132 via any of multi-touch gestures, gyroscope/accelerometer sensitive gestures or mouse/keyboard commands.

The system 200 can include in addition to the panel 270, which shows content of an image 202-A to be cropped through the opening of the opaque layer 275 associated with the crop-box, a navigator panel 280 which shows the entire image 202. The navigator panel 280 can also show a contour 285-A corresponding to an instance of the image content 202-A visible within the overlaid crop-box in the panel 270. The relative position and orientation of the instance of the contour 285-A with respect to the image 202 in the navigator panel 280 mimics the transformations applied to the image content 202-A in the panel 270, as described below in connection with FIGS. 2B, 2C and 2E-2G.

Once the crop-box applicator 114 has applied the crop-box to the received image 102, the user can enter a request 122 to zoom into image content 102-A shown in the viewer 170 through the opening of the mask 175 corresponding to the crop-box. Upon receiving the user request 122, the scaler 125 can zoom into the image content 102-A to generate a zoomed view of the image 102 corresponding to image content 102-B. In FIG. 2A, the user can enter a zoom instruction 222 via a multi-touch gesture (e.g. a pinch gesture) to zoom into the image content 202-A displayed in the panel 270.

Figure 2B:
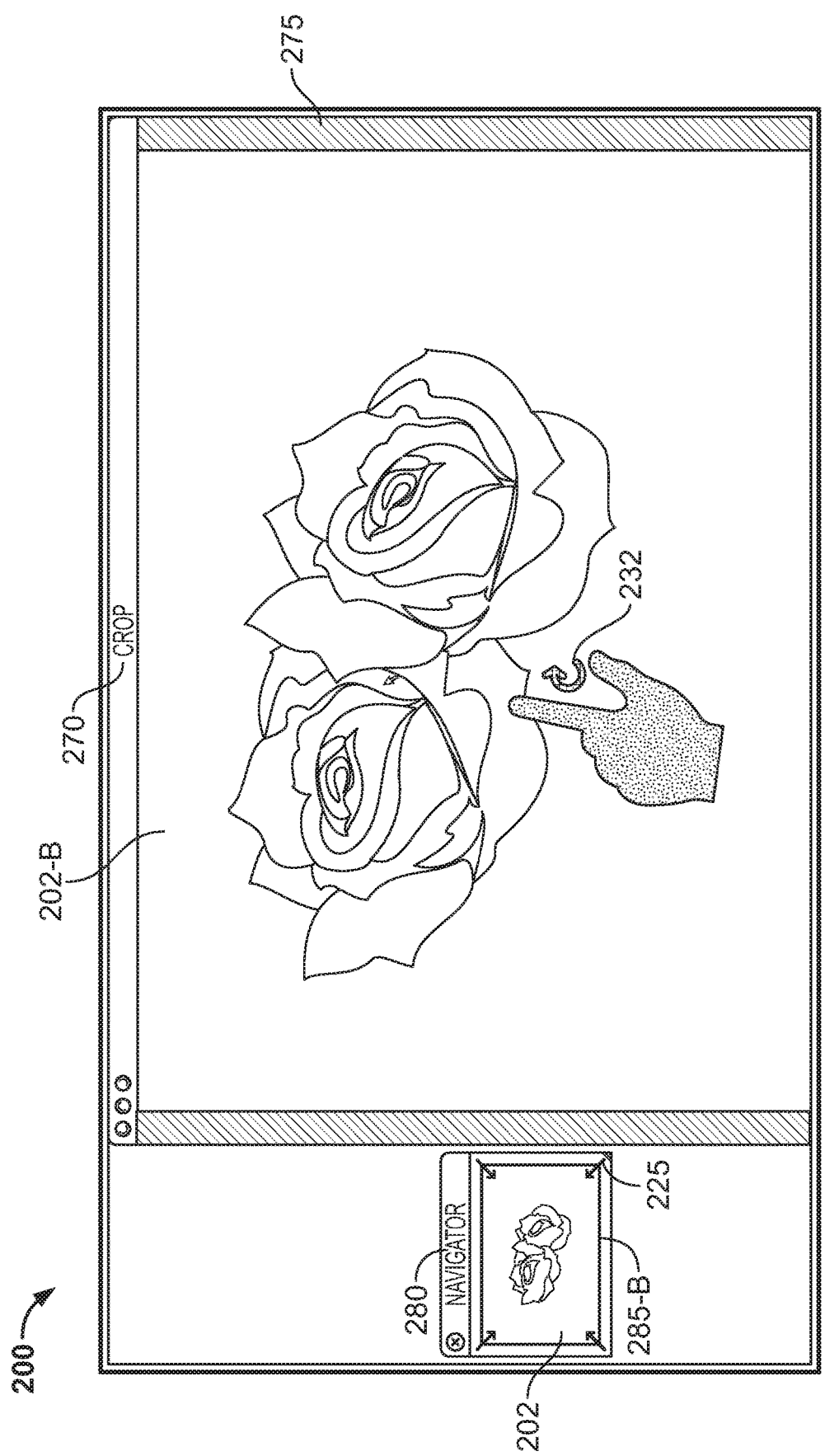

The effect of zooming into the image content 202-A is represented in the navigator panel 280 shown in FIG. 2B by inward-pointing arrows 225 indicating a decrease in relative size of the image content 202-8 after the zoom transformation 225 compared to the image content 202-A prior to the zoom transformation 225. The instance of the contour 285-B corresponds to the size and orientation of the image content 202-B, as shown in panel 270 through the opening of the mask 275 corresponding to the crop-box 5×7, with respect to the un-cropped image 202.

Once the scaler 125 has generated the zoomed view of the image 202 corresponding to the image content 102-B, the user can enter a request 132 to rotate the image content 102-B shown in the viewer 170 through the opening of the mask 175 corresponding to the crop-box. Upon receiving the user request 132, the rotator 135 can rotate the image content 102-B to generate a rotated view of the image 102 corresponding to image content 102-C. In FIG. 2B, the user can enter a rotate instruction 232 via a multi-touch gesture (e.g. a rotate gesture) to rotate the image content 202-B displayed in the panel 270.

Figure 2C:
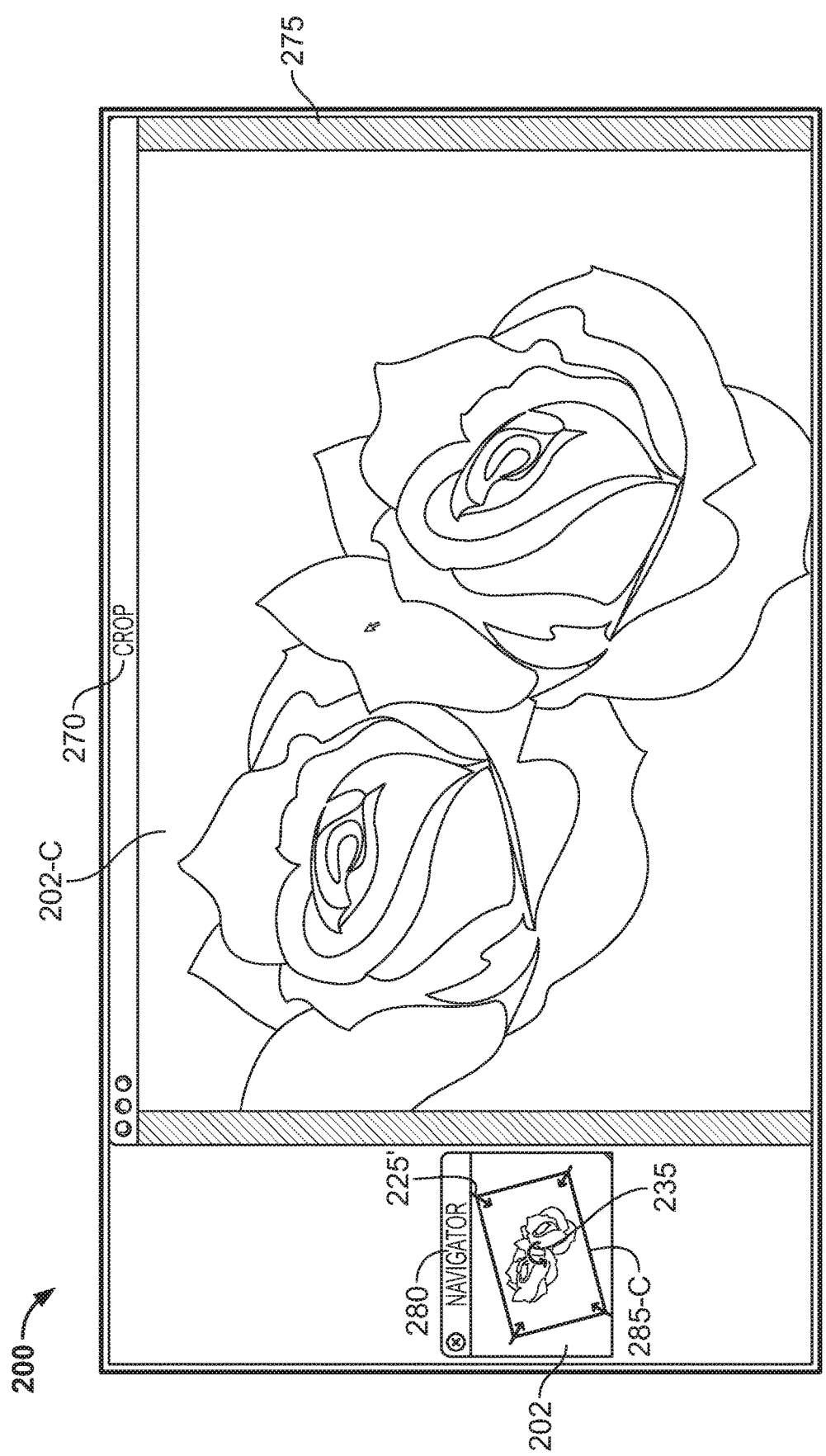

The effect of rotating and further zooming the image content 202-B is represented in the navigator panel 280 shown in FIG. 2C, by, respectively, an oriented arc 235 and inward-pointing arrows 225'. The oriented arc 235 indicates a relative orientation of the image content 202-C after the rotation transformation 235 compared to the orientation of the image content 202-B prior to the rotation transformation 235. Moreover, the inward-pointing arrows 225' indicate a further decrease in relative size of the image content 202-C after the additional zoom transformation 225' compared to the image content 202-B prior to the additional zoom transformation 225'. The instance of the contour 285-C corresponds to the orientation and size of the image content 202-C, shown in panel 270 through the opening of the mask 275 corresponding to the crop-box 5×7, with respect to the un-cropped image 202. In this case, the system 200 applied the additional zooming 225' in combination with the rotation 235 to avoid showing black areas in the panel 270 (to represent lack of content outside the edges of the image that is being rotated), or equivalently to avoid extending the contour 285-C outside of the navigator panel 280.

Figure 2D:
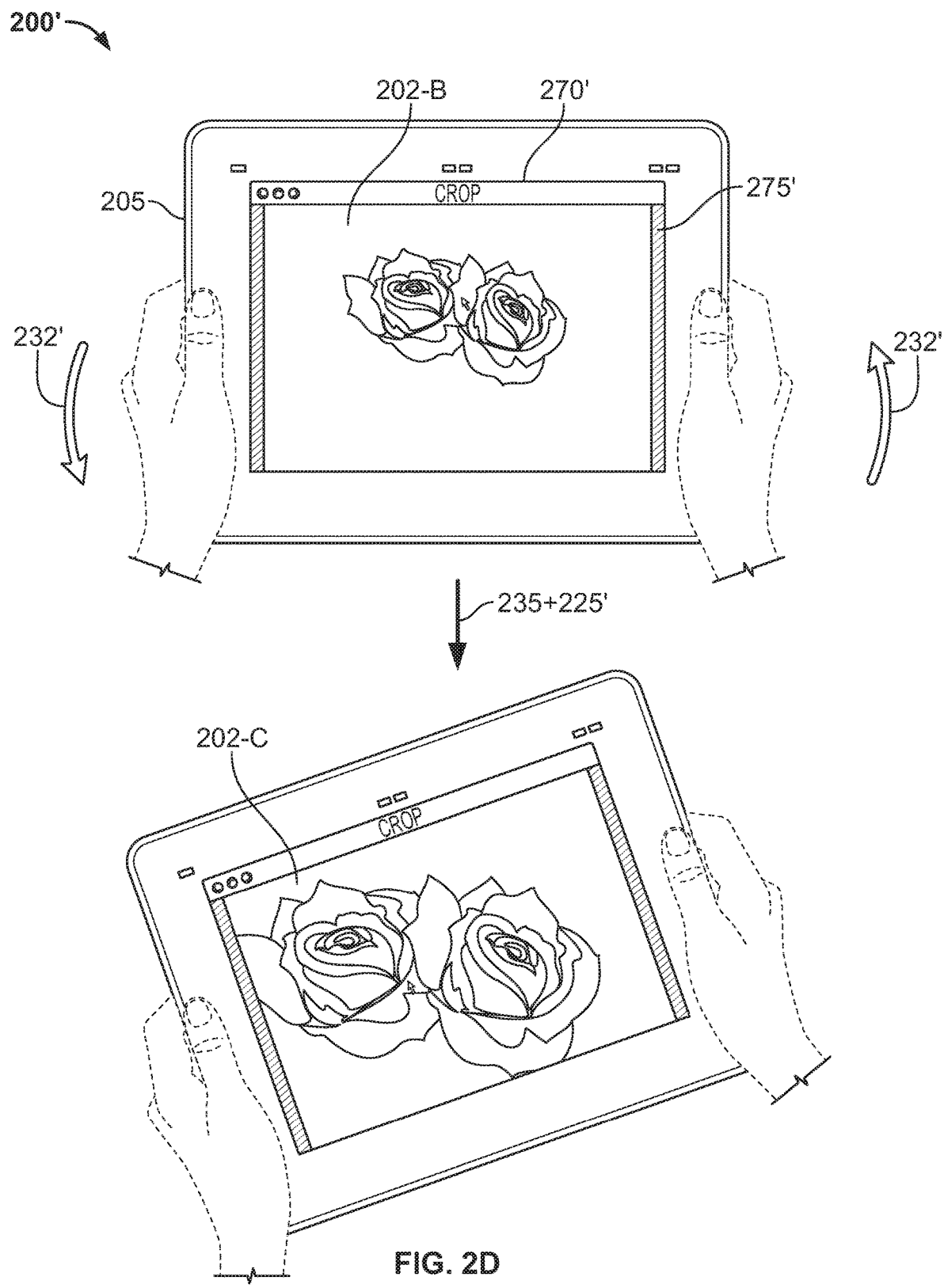

FIG. 2D shows an implementation 200' of the system 200 described above in connection with FIGS. 2A-2C. In FIG. 2D, the system 200' is implemented on a mobile appliance 205, for example a tablet computer, or a smart phone. Content of the zoomed view 202-B (obtained by applying a zoom transformation 225 as described above in connection with FIGS. 2A-2B) is displayed, in a panel 270' of a graphical user interface associated with the system 200', within a 5×7 opening of an opaque layer 275'. In this example, the mobile appliance 205 is equipped with a gyroscope or with two or more accelerometers that are configured to determine the pitch, roll and yaw angles of the mobile appliance 205's display with respect to a specified direction (for example, the vertical direction corresponding to gravity.)

Further, the system 200' can be configured to interpret changes in the pitch, roll and yaw angles of the mobile appliance 205's display with respect to the specified direction, the changes being caused, e.g., by the user moving the mobile appliance 205, as user requests to transform the image portion 202-B displayed through the crop-box in the panel 270'. As such, in response to the mobile appliance 205's gyroscope (or two or more accelerometers) detecting such user-induced angle changes, the system 200' can transform the image portion 202-B to make it appear that the image portion 202-B remains at rest with respect to the specified direction when the mobile appliance 205 is moved by the user. For example, the user places the system 200' in a movement-sensitive input mode by pressing and/or holding a button, then, in FIG. 2D, the user rotates the mobile appliance 205 in counter-clock-wise direction. The user's rotation gesture 232' can be detected by the mobile appliance 205's gyroscope (or two or more accelerometers) and is interpreted by the system 200' as a user request to rotate the image portion 202-B displayed in the panel 270' in a clock-wise direction. In response to the received user input 232', the system 200' applies a transformation (235+225'), which includes a combination of the rotation 235 and the zoom 225' operations, to the image portion 202-B to obtain a rotated and zoomed view of the image 202-C. In FIG. 2D, as in the case described above in connection with FIGS. 2B-2C, the system 200 can avoid showing black areas in the panel 270' (to represent lack of content outside the edges of the image that is being rotated within the crop-box) by applying the additional zoom 225' in combination with the rotation 235 as part of generating the transformed image view 202-C starting from the image view 202-B.

Figure 2E:
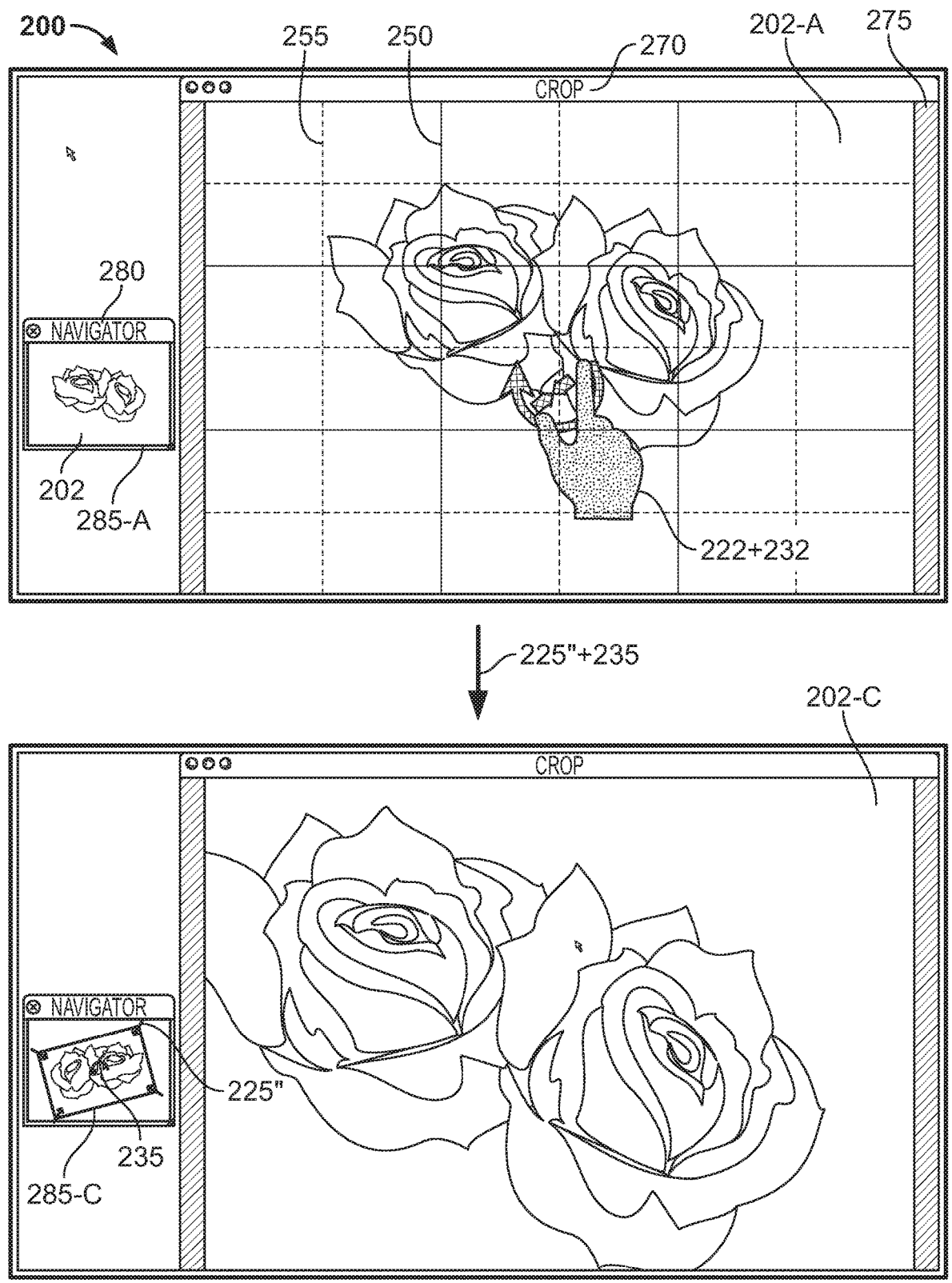

As described above in connection with FIGS. 2A-2D, the rotated and zoomed view 202-C can be obtained in the crop-box represented in the panel 270 by applying to the image view 202-A a sequence of operations including a zoom transformation 225, followed by a rotation transformation 235, where the latter can be applied in combination with an additional zoom transformation 225'. Moreover, as described below in connection with FIG. 2E, the system 200 can be configured to obtain the rotated and zoomed view 202-C by applying a single zoom-and-rotate operation (225"+235) to the image view 202-A shown in the panel 270 through the opening of the opaque layer 275 associated with the crop-box. In FIG. 2E, the user can enter one instruction via a single multi-touch gesture, e.g. a pinch-and-rotate gesture (222+232), to zoom and rotate the image content 202-A displayed in the panel 270. In addition, the system 200 can optionally draw within the panel 270 a rule of thirds grid 250 to partition the cropbox into nine equal parts (and/or a finer grid 255.) For example, the system 200 can draw the rule of thirds grid 250, in response to detecting that the user touches the multitouch I/O interface associated with the system 200, and can remove this coarse grid in response to detecting that the user ceases to touch the I/O interface. As another example, the system 200 can draw the finer grid 255, in response to detecting a rotate gesture 232, and can remove this fine grid in response to ceasing to detect the rotate gesture 232. Accordingly, such grid(s) overlaid on the image content 202-A can assist the user entering individual multi-touch gestures 222, 232 or the combined multi-touch gesture (222+232) to request the respective straighten (rotate) 235, zoom 225 and the combination of zoom-and-rotate (225"+235) transformations.

The effect of zooming and rotating the image content 202-A is represented in the navigator panel 280 shown in FIG. 2E by inward-pointing arrows 225" and an oriented arc 235, respectively. The inward-pointing arrows 225" indicate a decrease in relative size of the image content 202-C after the zoom-and-rotate transformation (225"+235) compared to the image content 202-A prior to the zoom-and-rotate transformation (225"+235). The oriented arc 235 indicates a relative orientation of the image content 202-C after the zoom- and rotate transformation (225"+235) compared to the orientation of the image content 202-B prior to the zoom-and-rotate transformation (225"+235). Additionally, in FIG. 2E like in FIG. 2C, the instance of the contour 285-C corresponds to the orientation and size of the image content 202-C, shown in the panel 270 through the opening of the mask 275 corresponding to the crop-box 5×7, with respect to the un-cropped image 202.

The pinch-and-rotate gesture (222+232) through which a user associated with the system 200 can request to zoom-in and rotate content of an image within the cropbox and, similarly, the reverse-pinch-and-rotate gesture through which the user can request to zoom-out and rotate content of the image in the crop-box can be very fluid multi-touch gestures for most people. As such, some persons who enter a pinch (reverse-pinch) gesture may want to request that only a single zoom-in (out) transformation be applied to the image content displayed in the crop-box by the system 200, but may inadvertently manage to also tilt the image when using the foregoing gesture, because the system 200 can interpret the user-entered pinch (reverse-pinch) gesture as a zoom-and-rotate request. Also, some persons who enter a rotate gesture may want to request that only a single straighten transformation be applied to the image content displayed in the crop-box by the system 200, but may inadvertently manage to also scale (zoom) the image when using the foregoing gesture, because the system 200 can interpret the user-entered rotate gesture as a zoom-and-rotate request.

In some implementations, to accurately interpret distinct user requests when detecting two or more multi-touch gestures, the system 200 can be configured to apply a single transformation to the content of an image in the crop-box, such that the applied single transformation corresponds to the first detected multi-touch gesture. In these implementations, the system is configured to exclude other transformations corresponding to one or more multi-touch gestures detected subsequent to the first detected multi-touch gesture. For example, if the system 200 detects that a sequence of user-entered multi-touch gestures starts with a pinch (reverse-pinch) gesture that is then followed by a rotate gesture, the system 200 applies the zoom-in (out) transformation corresponding to the pinch (reverse-pinch) gesture to the image content displayed in the crop-box. In this case, the rotate gesture that followed the initially detected pinch (reverse-pinch) gesture is excluded and no rotation transformation is applied to the image content in the crop-box. If the user desires to also rotate the image content in the crop-box, the user can lift his fingers from the multi-touch I/O interface, and then can apply a separate rotate gesture. As another example, if the system 200 detects that user-entered multi-touch gestures start with a rotate gesture that is then followed by a pinch (reverse-pinch) gesture, the system 200 applies the rotate transformation corresponding to the rotate gesture to the image content displayed in the crop-box. In this case, the pinch (reverse-pinch) gesture that followed the initially detected rotate gesture is excluded and no zoom-in (out) transformation is applied to the image content in the crop-box. If the user desires to also zoom-in (out) the image content in the crop-box, the user can lift his fingers from the multi-touch I/O interface, and then can apply a separate pinch (reverse-pinch) gesture.

In other implementations, to accurately interpret distinct user requests when detecting a pinch (reverse-pinch) gesture and a rotate gesture, the system 200 can be configured to apply first a zoom-in (out) transformation corresponding to the detected pinch (reverse-pinch) gesture, followed by a rotation transformation, only if the rotation angle corresponding to the detected rotation gesture exceeds a threshold angle. The threshold angle can be specified (pre-set) by the user and can be, e.g., 1°, 5°, 10°, etc. In this manner, users who only want to scale (zoom-in/out) the image content in the crop-box, must keep the rotation angle corresponding to an inadvertent rotation gesture under the threshold angle. Moreover, users who want to rotate the image content in the crop-box must apply a rotate gesture corresponding to an angle greater than the threshold angle. In these implementations, the system 200 can notify the user that the rotate gesture exceeds the threshold angle by displaying within the panel 270 both the rule of thirds grid 250 and the finer grid 255, or that the rotate gesture is less than or equal to the threshold angle by displaying within the panel 270 only the rule of thirds grid 250.

In some other implementations, to accurately interpret distinct user requests when detecting a pinch (reverse-pinch) gesture and a rotate gesture, the system 200 can be configured to apply first a rotate transformation corresponding to the detected rotate gesture, followed by a scale (zoom-in/out) transformation, only if the scale factor corresponding to the detected pinch (reverse-pinch) gesture exceeds a threshold scale. The scale associated with a pinch (reverse-pinch) gesture can be proportional with the change in distance between the two fingers used for the multi-touch pinch (reverse-pinch) gesture. For example, the threshold scale can be specified (pre-set) by the user and can be, e.g. 0.2×, 0.5×, 2×, etc. In this manner, users who only want to rotate the image content in the crop-box must keep the scale corresponding to an inadvertent zoom-in/out under the threshold scale. Moreover, users who want to zoom-in (out) the image content in the crop-box must apply a pinch (reverse-pinch) gesture corresponding to a scale greater than the threshold scale.

In addition to enabling a user to zoom and straighten the image 202, system 200 can optionally provide functionality to allow the user to further refine the image content 202-C. FIG. 2F shows that the system 200 can optionally draw within the panel 270 the rule of thirds grid 250. The latter can assist the user with requesting a pan 245 transformation, for instance. Additionally, FIG. 2F shows that the system 200 can mask the content of the image outside of the crop-box with a translucent layer 276 (instead of the opaque layer 275 shown in FIGS. 2A-2E.) The semitransparent layer 276 enables visualization of the image content immediately adjacent to the image content 202-C selected to be cropped.

For example in FIG. 2F, the user can determine that a petal of the upper-left flower can be fully contained in the overlaid crop-box, if the image content 202-C were panned (translated) rightward. In addition, assuming that the user wishes to switch a viewer's attention within the composition 202-C from the lower-right flower to the upper-left flower, the user can instruct the system 200 to pan the image content 202-C in a diagonal direction within the crop-box to approximately place the center of the upper-left flower at the upper-left vertex of the rules of thirds grid 250.

Once the rotator 135 has generated the rotated view of the image 102 corresponding to the image content 102-C, the user can enter a request 142 to pan the image content 102-C shown in the viewer 170 through the opening of the mask 175 corresponding to the crop-box. Upon receiving the user request 142, the translator 145 can pan (translate) the image content 102-C to generate a panned view of the image 102 corresponding to image content 102-F. In FIG. 2F, the user can enter a pan instruction 242 via a touch gesture (e.g. a swipe gesture) to pan the image content 202-C displayed in the panel 270.

Figure 2G:
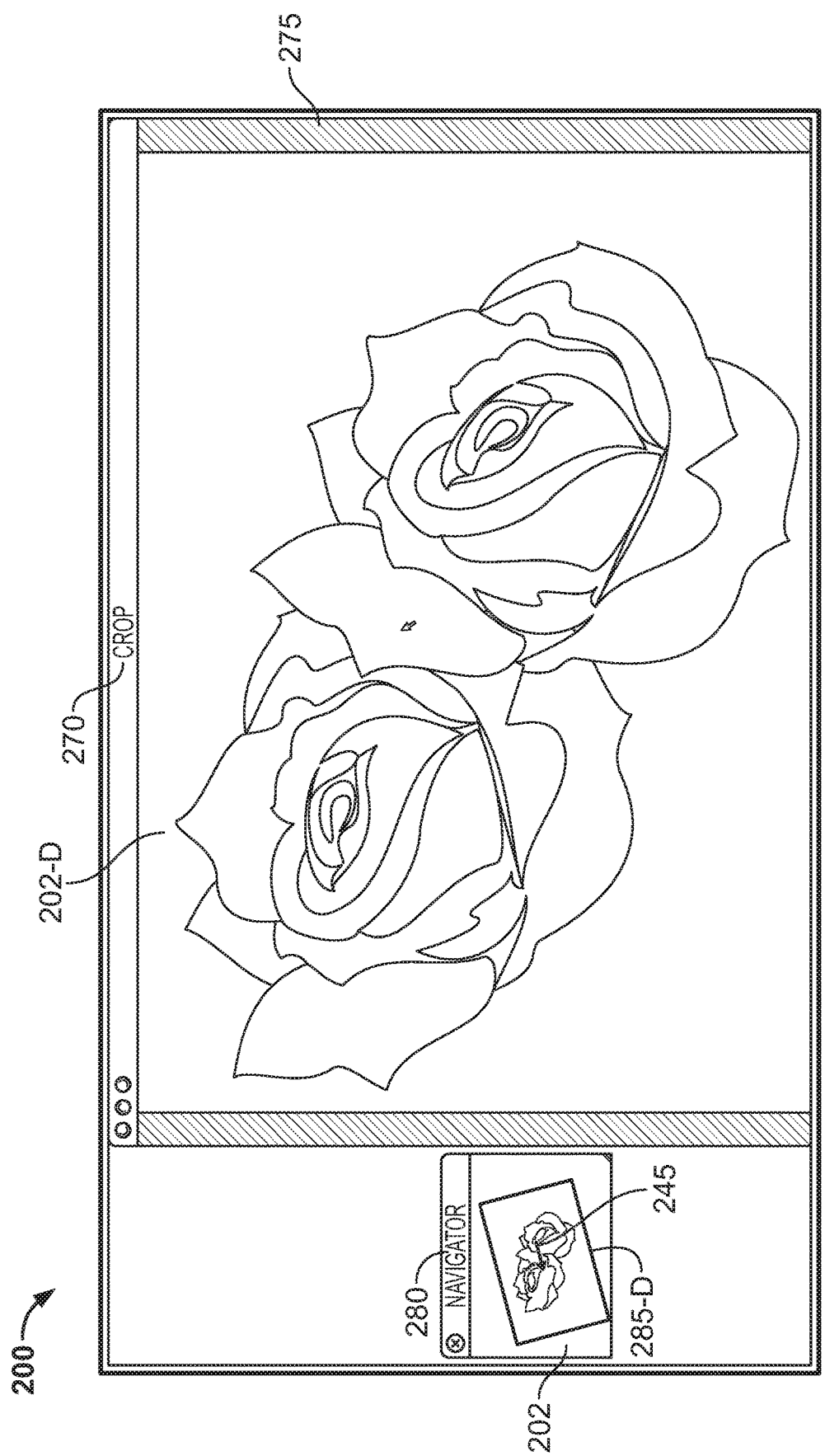

The effect of panning the image content 202-C is represented in the navigator panel 280 shown in FIG. 2G by an arrow 245 indicating a relative displacement of the image content 202-C after the translation transformation 245 compared to a location of the image content 202-C prior to the translation transformation 245. The instance of the contour 285-D corresponds to the size, orientation and location of the image content 202-D, shown in panel 270 through the opening of the mask 275 corresponding to the crop-box 5×7, with respect to the un-cropped image 202.

The image transformations (zoom 125, 225, 225', 225''; rotation 135, 235; pan 145, 245) described above in connection with FIGS. 1 and 2A-2G are applied to image content within the crop-box by the multifunctional cropping utility 110, in an interactive mode. As described above, some of these operations can be applied sequentially in an order specified by the user associated with the image processing application. Other orders of applying the images transformations, different from the order described above, are possible. For example, the user can instruct the multifunctional cropping utility 110 to pan, rotate, and then zoom the image content within the crop-box. In another example, the requested order of operations can be rotate, pan and zoom. And so on. Moreover, some of these operations can be performed concurrently. For example the zoom 225'' and the rotation 235 operations were performed simultaneously, in response to a multi-touch gesture (222+232) that was a combination of zoom-in (pinch) and rotate gestures, as described above in connection with FIG. 2E. In addition, one or more of the operations can be repeated. In the example above, the zoom operation 225 (as part of the transition between FIGS. 2A to 2B) was repeated once as the zoom operation 225' (as part of the transition between FIGS. 2B to 2C/2D.) As another example, the panning transformation 245 can be replaced by and/or combined with another rotation operation to place both flowers substantially over vertexes of the rule of thirds grid 250. Further, the systems 100 and 200 can be configured to undo/redo any one of the last multitude of individual operations. For the purpose of undoing and redoing, an individual operation includes one or more transformations performed by the system 200 between the start of the user-entered multi-touch gesture (e.g., finger begins touching the multi-touch I/O interface) and the end of the user-entered multi-touch gesture (e.g., finger stops touching the multi-touch I/O interface.) Examples of individual transformations described above are the zoom transformation 225 applied to content of image 202-A, and the rotate transformation 235 applied to content of image 202-B. Moreover, the zoom+rotation combinations (225'+235) and (225''+235) also can be considered individual transformations because, in these cases, the zoom and rotation operations were requested as part of a single multi-touch gesture.

Once the user associated with the system 100 (or 200) has evaluated multiple compositions (e.g., different orientations, magnifications, portions of content) from the image 102, the user can commit the zoom 125, rotate 135 and pan 145 transformations applied to the image content 102-D by issuing a request 116 to complete cropping the image 102. In response to receiving the instruction to complete cropping 116, the cropper 118 generates an output image 104 corresponding to the image content 102-D. In this fashion, the multifunctional cropping utility 110 of the system 100 has transformed a portion of the input image 102 in accordance with multiple user requests, without releasing control back to the system 100. In this manner, the multifunction cropping utility 110 can output a composition 104 that incorporates all the transformations (zooms, rotations and pans) requested by the user. Moreover, the systems 100 and 200 can be configured to undo/redo the entire crop change operation that includes the application of the crop-box 114, all the transformations (zooms, rotations and pans) requested by the user that were applied to the image content within the applied crop-box, and the crop 118 of the transformed content.

Figure 3:
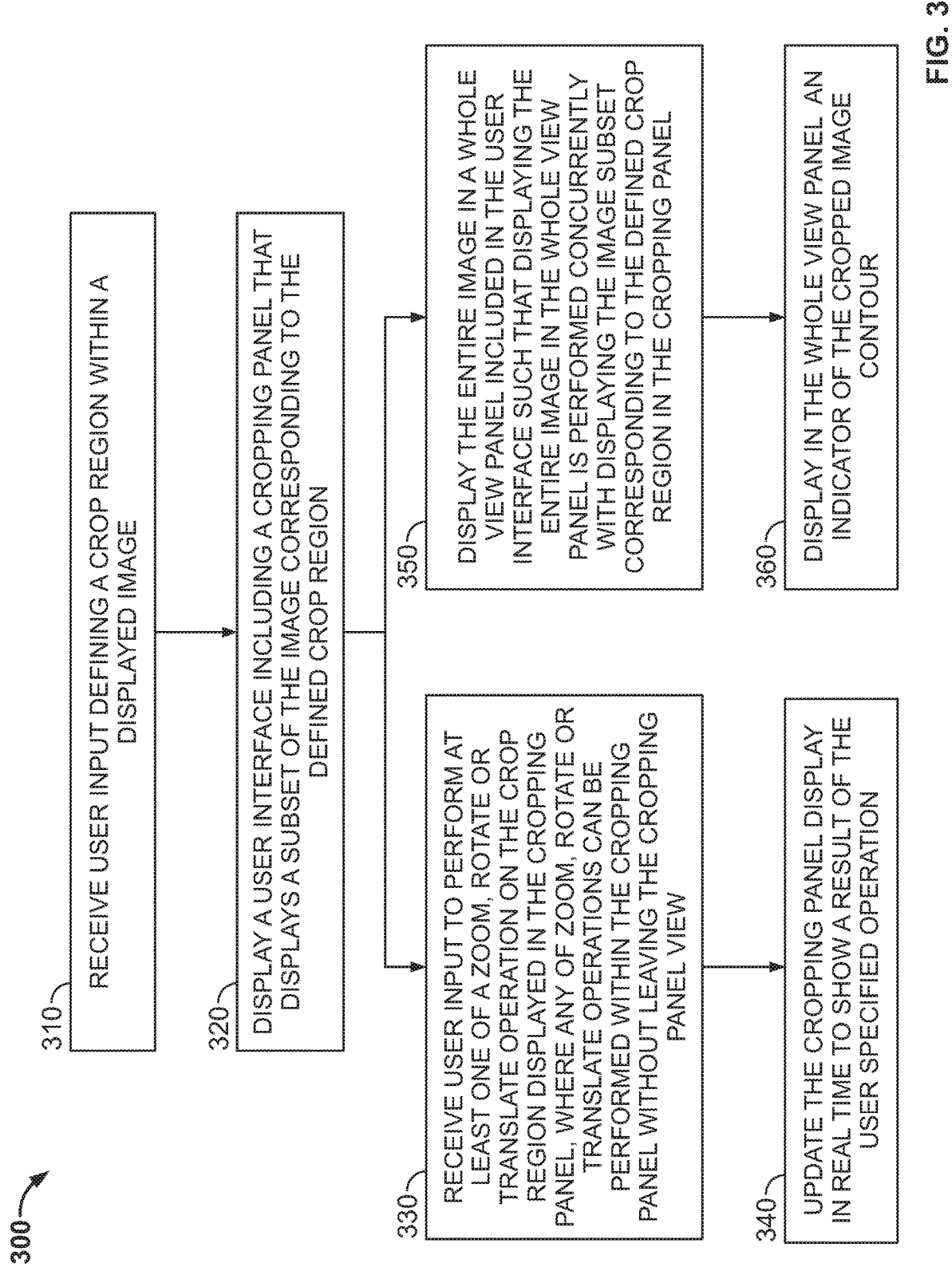
FIG. 3 shows an example of a method for performing multiple image transformations within an image cropping environment.

FIG. 3 shows an example of a method 300 for performing multiple image transformations within an image cropping environment. In some implementations, the method 300 can be executed by one or more appliances, for example by the tablet computer 205 in conjunction with system 100 (or 200), to perform image transformations on image content within a specified crop-window. For instance, the process 300 can be applied to an image displayed in a predetermined region of a user interface of an image processing application.

At 310, a user input defining a crop region within a displayed image is received. In some implementations, the user input can be provided via a menu of a user interface including multiple predetermined aspect ratios and sizes of a crop-window, e.g., 4×5, 5×7, 16×9, etc. (as described above in connection with FIG. 2A.) In other implementations, the user can specify a custom size of the crop-window. The custom size can be drawn by the user on the displayed image, for example, by using multitouch gestures or a cursor.

At 320, a user interface including a cropping panel is displayed. The cropping panel displays a subset of the image corresponding to the defined crop region. In some implementations, content of the displayed image different from the subset of the image corresponding to the defined crop region can be masked in the cropping panel by using an opaque layer (as described above in connection with FIGS. 1, 2A-2C and 2E.) In other implementations, the mask layer can be translucent (as described above in connection with FIG. 2D.)

At 330, a user input requesting to perform at least one of a zoom, rotate or translate operation on the crop region displayed in the cropping panel is received. In some implementations, the user inputs can be provided via multi-touch gestures (as described above in connection with FIGS. 2A, 2B, 2C, 2E and 2F.) In other implementations when the method 300 is executed by a mobile appliance equipped with a gyroscope or two or more accelerometers, the user inputs can be provided at least in part via gyroscope/accelerometer sensitive gestures (as described above in connection with FIG. 2D.) In some other implementations, the user inputs can be provided via keyboard/mouse. In addition, the user interface is configured such that any of zoom, rotate or translate operations can be performed within the cropping panel without leaving the cropping panel view.

At 340, the cropping panel display can be updated in real time to show a result of the user specified operation. In this fashion, the content shown within the crop region in the cropping panel can be manipulated (panned, zoomed, rotated) as desired by the user, while the crop region maintains its size and orientation with respect to the cropping panel. Updating the cropping panel live, as the user specified transformations are being applied, allows the user to see what an output image corresponding to the crop region would look like upon applying the crop function to the transformed crop region of the image. In some implementations, content within the crop region can be automatically zoomed-in (magnified) when rotating such content would cause the user interface to display edges of the image within the crop region displayed in the cropping panel. In some implementations, a grid can be overlaid on content within the crop region displayed in the cropping panel to guide the user in requesting rotation, pan and zoom transformations to this content. For example, the grid can be the rule of thirds grid corresponding to the content within the crop region. As another example, the grid can be denser the rule of thirds grid.

At 350, the user interface can include a whole view panel in addition to the cropping panel. The entire image can be displayed in the whole view panel concurrently with the image subset corresponding to the defined crop region displayed in the cropping panel. In the example implementation of the multifunctional cropping system 200, described above in connection with FIGS. 2A-2C and 2E-2G, the whole view panel corresponds to the navigator window 280.

At 360, an indicator of the cropped image contour can be displayed in the whole view panel. Further, the contour corresponds to the crop region from the cropping panel. Furthermore, the relative position and orientation of the contour with respect to the image within the whole view panel mimics the transformations applied to the image content within the cropping panel. In some implementations, the contour in the whole view panel is restricted from crossing the borders of the image. This restriction prevents the transformations applied to the image content within the crop region in the cropping panel from extending over the image's borders. To enforce such restriction, the image content within the crop-region can be zoomed-in automatically when rotated.

Figure 4:
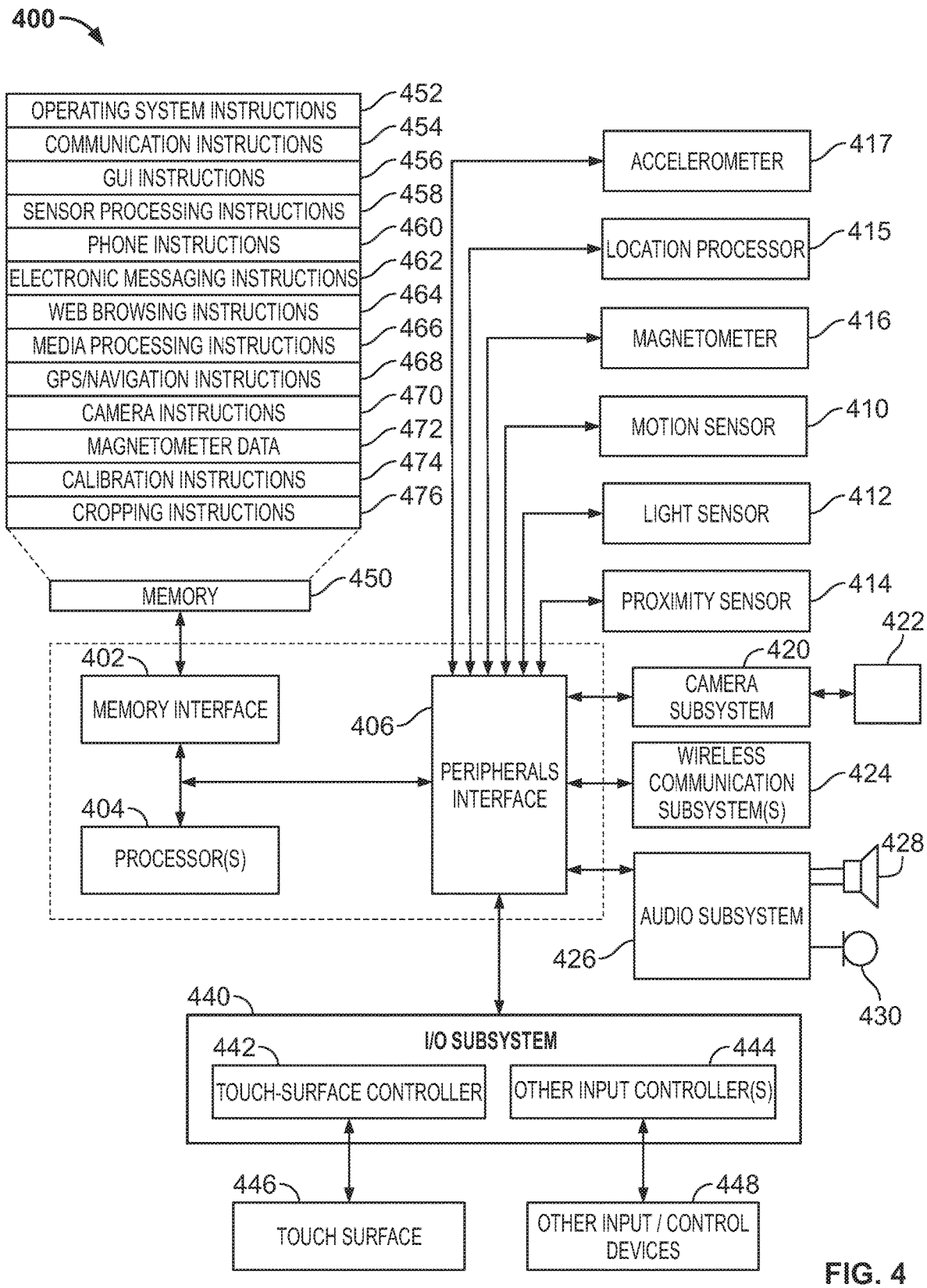
FIG. 4 is a block diagram of an example of a mobile device operated according to the technologies described above in connection with FIGS. 1-3.

FIG. 4 is a block diagram of an example of a mobile device 400 operated according to the technologies described above in connection with FIGS. 1-3. For example, a mobile device that can be configured to perform the technologies disclosed in this specification is the tablet computer 205 described above in connection with FIG. 2D. The mobile device 400 can include memory interface 402, one or more data processors, image processors and/or processors 404, and peripherals interface 406. Memory interface 402, one or more processors 404 and/or peripherals interface 406 can be separate components or can be integrated in one or more integrated circuits. Processors 404 can include one or more application processors (APs) and one or more baseband processors (BPs). The application processors and baseband processors can be integrated in one single process chip. The various components in mobile device 400, for example, can be coupled by one or more communication buses or signal lines.

Sensors, devices, and subsystems can be coupled to peripherals interface 406 to facilitate multiple functionalities. For example, motion sensor 410, light sensor 412, and proximity sensor 414 can be coupled to peripherals interface 406 to facilitate orientation, lighting, and proximity functions of the mobile device. Location processor 415 (e.g., GPS receiver) can be connected to peripherals interface 406 to provide geopositioning. Electronic magnetometer 416 (e.g., an integrated circuit chip) can also be connected to peripherals interface 406 to provide data that can be used to determine the direction of magnetic North. Thus, electronic magnetometer 416 can be used as an electronic compass. Accelerometer 417 can also be connected to peripherals interface 406 to provide data that can be used to determine change of speed and direction of movement of the mobile device.

Camera subsystem 420 and an optical sensor 422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 424, which can include radio frequency receivers and transmitters and/or optical (e.g., infrared) receivers and transmitters. The specific design and implementation of the communication subsystem 424 can depend on the communication network(s) over which a mobile device is intended to operate. For example, a mobile device can include communication subsystems 424 designed to operate over a GSM network, a GPRS network, an EDGE network, a Wi-Fi or WiMax network, and a Bluetooth network. In particular, the wireless communication subsystems 424 can include hosting protocols such that the mobile device can be configured as a base station for other wireless devices.

Audio subsystem 426 can be coupled to a speaker 428 and a microphone 430 to facilitate voice-enabled functions, such as voice recognition, voice replication, digital recording, and telephony functions.

I/O subsystem 440 can include touch surface controller 442 and/or other input controller(s) 444. Touch-surface controller 442 can be coupled to a touch surface 446 (e.g., a touch screen or touch pad). Touch surface 446 and touch surface controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 446.

Other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of speaker 428 and/or microphone 430.

In some implementation, a pressing of the button for a first duration may disengage a lock of the touch surface 446; and a pressing of the button for a second duration that is longer than the first duration may turn power to mobile device 400 on or off. The user may be able to customize a functionality of one or more of the buttons. The touch surface 446 can, for example, also be used to implement virtual or soft buttons and/or a keyboard, such as a soft keyboard on a touch-sensitive display.

In some implementations, mobile device 400 can present recorded audio and/or video files, such as MP3, AAC, and MPEG files. In some implementations, mobile device 400 can include the functionality of an MP3 player, such as an iPod™. Mobile device 400 may, therefore, include a pin connector that is compatible with the iPod. Other input/output and control devices can also be used.

Memory interface 402 can be coupled to memory 450. Memory 450 can include high-speed random access memory and/or non-volatile memory, such as one or more magnetic disk storage devices, one or more optical storage devices, and/or flash memory (e.g., NAND, NOR). Memory 450 can store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 can include a kernel (e.g., UNIX kernel).

Memory 450 may also store communication instructions 454 to facilitate communicating with one or more additional devices, one or more computers and/or one or more servers. Memory 450 may include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate Global Navigation Satellite System (GNSS) (e.g., GPS) and navigation-related processes and instructions; camera instructions 470 to facilitate camera-related processes and functions; magnetometer data 472 and calibration instructions 474 to facilitate magnetometer calibration. The memory 450 may also store other software instructions (not shown), such as security instructions, web video instructions to facilitate web video-related processes and functions, and/or web shopping instructions to facilitate web shopping-related processes and functions. In some implementations, the media processing instructions 466 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 450. Memory 450 can include integrated cropping instructions 476 that can include cropping, zooming, rotating and panning functions, and other related functions described with respect to FIGS. 1-3.

Each of the above identified instructions and applications can correspond to a set of instructions for performing one or more functions described above. These instructions need not be implemented as separate software programs, procedures, or modules. Memory 450 can include additional instructions or fewer instructions. Furthermore, various functions of the mobile device may be implemented in hardware and/or in software, including in one or more signal processing and/or application specific integrated circuits.

Figure 5:
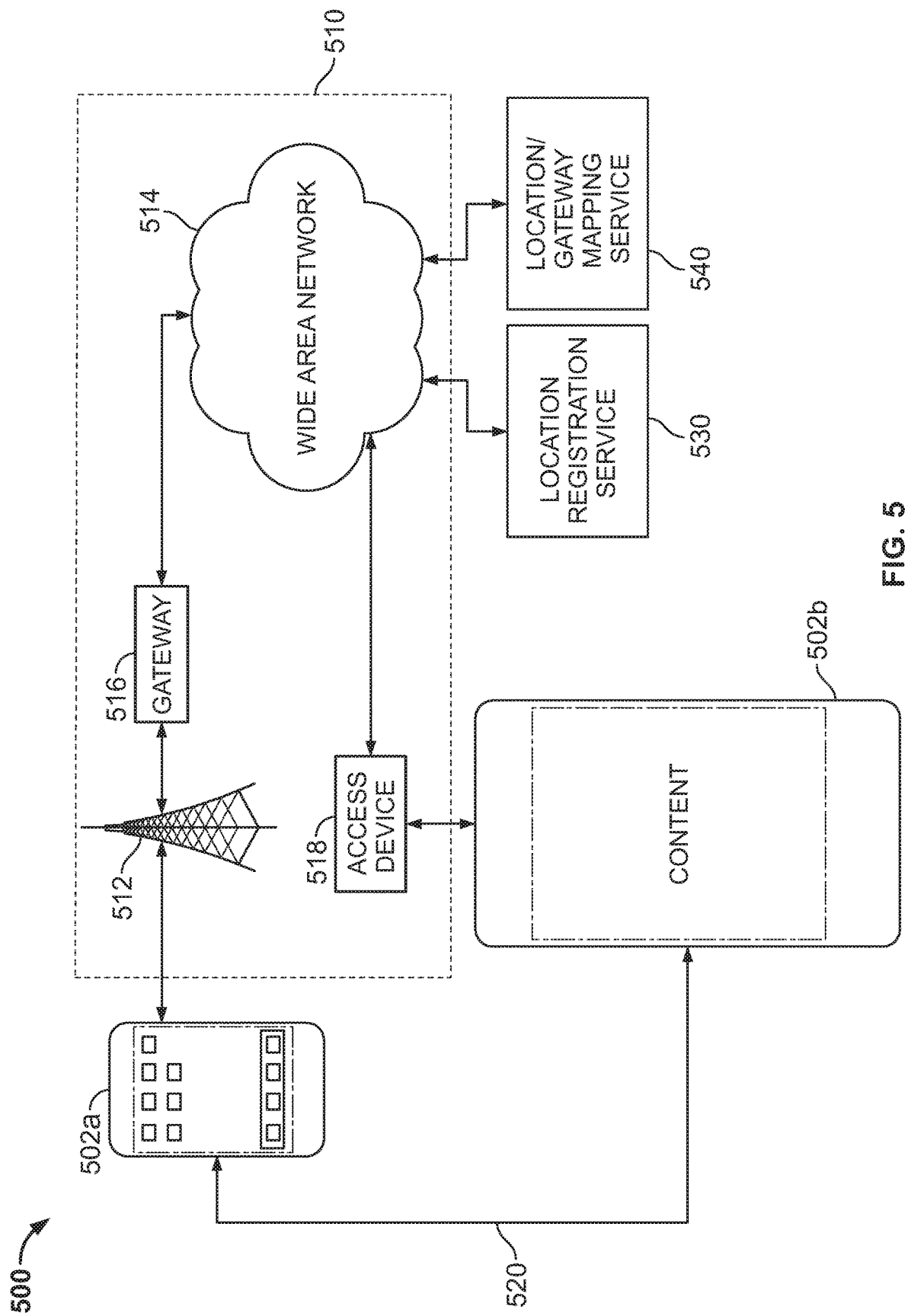
FIG. 5 is a block diagram of an example of a network operating environment for mobile devices operated according to the technologies described above in connection with FIGS. 1-3.

FIG. 5 is a block diagram of an example of a network operating environment 500 for mobile devices operated according to the technologies described above in connection with FIGS. 1-3. Mobile devices 502a and 502b can, for example, communicate over one or more wired and/or wireless networks 510 in data communication. For example, a wireless network 512, e.g., a cellular network, can communicate with a wide area network (WAN) 514, such as the Internet, by use of a gateway 516. Likewise, an access device 518, such as an 802.11g wireless access device, can provide communication access to the wide area network 514.

In some implementations, both voice and data communications can be established over wireless network 512 and the access device 518. For example, mobile device 502a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 512, gateway 516, and wide area network 514 (e.g., using Transmission Control Protocol/Internet Protocol (TCP/IP) or User Datagram Protocol (UDP)). Likewise, in some implementations, the mobile device 502b can place and receive phone calls, send and receive e-mail messages, and retrieve electronic documents over the access device 518 and the wide area network 514. In some implementations, mobile device 502a or 502b can be physically connected to the access device 518 using one or more cables and the access device 518 can be a personal computer. In this configuration, mobile device 502a or 502b can be referred to as a "tethered" device.

Mobile devices 502a and 502b can also establish communications by other means. For example, wireless device 502a can communicate with other wireless devices, e.g., other mobile devices 502a or 502b, cell phones, etc., over the wireless network 512. Likewise, mobile devices 502a and 502b can establish peer-to-peer communications 520, e.g., a personal area network, by use of one or more communication subsystems, such as the Bluetooth™ communication devices. Other communication protocols and topologies can also be implemented.

The mobile device 502a or 502b can, for example, communicate with one or more services 530 and 540 over the one or more wired and/or wireless networks. For example, one or more location registration services 530 can be used to associate application programs with geographic regions. The application programs that have been associated with one or more geographic regions can be provided for download to mobile devices 502a and 502b.

Location gateway mapping service 540 can determine one or more identifiers of wireless access gateways associated with a particular geographic region, and provide the one or more identifiers to mobile devices 502a and 502b for registration in association with a baseband subsystem.

Mobile device 502a or 502b can also access other data and content over the one or more wired and/or wireless networks. For example, content publishers, such as news sites, Really Simple Syndication (RSS) feeds, web sites, biogs, social networking sites, developer networks, etc., can be accessed by mobile device 502a or 502b. Such access can be provided by invocation of a web browsing function or application (e.g., a browser) in response to a user touching, for example, a Web object.

Implementations of the subject matter and the functional operations described in this specification can be configured in digital electronic circuitry, in tangibly-embodied computer software or firmware, in computer hardware, including the structures disclosed in this specification and their structural equivalents, or in combinations of one or more of them. Implementations of the subject matter described in this specification can be configured as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   at an electronic device with a display and one or more input devices:
   displaying, on the display, a cropping user interface that includes an image and a visual indication of a cropping region that corresponds to a first portion of the image, wherein the visual indication is overlaid on the image;
   detecting a request, via the one or more input devices, to change the cropping region; and
   in response to the request to change the cropping region to correspond to a second portion of the image:
   resizing the visual indication of the cropping region to a first size corresponding to the second portion of the image; and
   resizing the visual indication of the cropping region to a second size different from the first size and resizing the image while the visual indication of the cropping region remains corresponding to the second portion of the image.

2. The method of claim 1, wherein the request to change the cropping region is a request to change an aspect ratio of the cropping region.

3. The method of claim 1, wherein the request to change the cropping region includes a request to move the cropping region.

4. The method of claim 1, wherein the visual indication of the cropping region is a crop-box.

5. The method of claim 1, wherein resizing visual indication of the cropping region includes enlarging the cropping region.

6. The method of claim 1, wherein resizing the image includes enlarging the image.

7. The method of claim 1, wherein portions of the image outside of the visual indication of the cropping region are deemphasized relative to portions of the image inside of the visual indication of the cropping region.

8. The method of claim 1 wherein:
   displaying a cropping user interface includes displaying the cropping region at a first size;
   resizing the visual indication of the cropping region to correspond to the second portion of the image includes resizing the cropping region from the first size to a second size that is different from the first size; and
   resizing the visual indication of the cropping region, while the visual indication of the cropping region corresponds to the second portion of the image, includes resizing the visual indication of the cropping region from the second size to a third size that is different from the second size.

9. The method of claim 1, wherein the cropping region remains corresponding to the second portion the image after resizing the visual indication of the cropping region and resizing the image.

10. A non-transitory computer readable storage medium storing one or more programs, the one or more programs comprising instructions, which when executed by an electronic device with a display, one or more input devices and one or more processors, cause the device to perform a method, the method comprising:
    displaying, on the display, a cropping user interface that includes an image and a visual indication of a cropping region that corresponds to a first portion of the image, wherein the visual indication is overlaid on the image;
    detecting a request, via the one or more input devices, to change the cropping region; and
    in response to the request to change the cropping region to correspond to a second portion of the image:
    resizing the visual indication of the cropping region to a first size corresponding to the second portion of the image; and
    resizing the visual indication of the cropping region to a second size different from the first size and resizing the image while the visual indication of the cropping region remains corresponding to the second portion of the image.

11. The non-transitory computer readable storage medium of claim 10, wherein the request to change the cropping region is a request to change an aspect ratio of the cropping region.

12. The non-transitory computer readable storage medium of claim 10, wherein the request to change the cropping region includes a request to move the cropping region.

13. The non-transitory computer readable storage medium of claim 10, wherein the visual indication of the cropping region is a crop-box.

14. The non-transitory computer readable storage medium of claim 10, wherein resizing visual indication of the cropping region includes enlarging the cropping region.

15. The non-transitory computer readable storage medium of claim 10, wherein resizing the image includes enlarging the image.

16. The non-transitory computer readable storage medium of claim 10, wherein portions of the image outside of the visual indication of the cropping region are deemphasized relative to portions of the image inside of the visual indication of the cropping region.

17. The non-transitory computer readable storage medium of claim 10 wherein:
displaying a cropping user interface includes displaying the cropping region at a first size;
resizing the visual indication of the cropping region to correspond to the second portion of the image includes resizing the cropping region from the first size to a second size that is different from the first size; and
resizing the visual indication of the cropping region, while the visual indication of the cropping region corresponds to the second portion of the image, includes resizing the visual indication of the cropping region from the second size to a third size that is different from the second size.

18. The non-transitory computer readable storage medium of claim 10, wherein the cropping region remains corresponding to the second portion the image after resizing the visual indication of the cropping region and resizing the image.

19. A computing device comprising:
a display;
one or more input devices; and
one or more processors capable of:
displaying, on the display, a cropping user interface that includes an image and a visual indication of a cropping region that corresponds to a first portion of the image, wherein the visual indication is overlaid on the image;
detecting a request, via the one or more input devices, to change the cropping region; and
in response to the request to change the cropping region to correspond to a second portion of the image:
resizing the visual indication of the cropping region to a first size corresponding to the second portion of the image; and
resizing the visual indication of the cropping region to a second size different from the first size and resizing the image while the visual indication of the cropping region remains corresponding to the second portion of the image.

20. The computing device of claim 19, wherein the request to change the cropping region is a request to change an aspect ratio of the cropping region.

21. The computing device of claim 19, wherein the request to change the cropping region includes a request to move the cropping region.

22. The computing device of claim 19, wherein the visual indication of the cropping region is a crop-box.

23. The computing device of claim 19, wherein resizing visual indication of the cropping region includes enlarging the cropping region.

24. The computing device of claim 19, wherein resizing the image includes enlarging the image.

25. The computing device of claim 19, wherein portions of the image outside of the visual indication of the cropping region are deemphasized relative to portions of the image inside of the visual indication of the cropping region.

26. The computing device of claim 19 wherein:
displaying a cropping user interface includes displaying the cropping region at a first size;
resizing the visual indication of the cropping region to correspond to the second portion of the image includes resizing the cropping region from the first size to a second size that is different from the first size; and
resizing the visual indication of the cropping region, while the visual indication of the cropping region corresponds to the second portion of the image, includes resizing the visual indication of the cropping region from the second size to a third size that is different from the second size.

27. The computing device of claim 19, wherein the cropping region remains corresponding to the second portion the image after resizing the visual indication of the cropping region and resizing the image.

* * * * *